INVENTORS
MICHAEL J. KELLY
BERNARD J. REKIERE
BY
AGENT

April 7, 1970 M. J. KELLY ET AL 3,505,659

TECHNIQUES FOR TIME SHARING MEMORY SENSE AMPLIFIERS USING DELAY LINES

Filed Jan. 16, 1967 4 Sheets-Sheet 2

April 7, 1970 M. J. KELLY ET AL 3,505,659

TECHNIQUES FOR TIME SHARING MEMORY SENSE AMPLIFIERS USING DELAY LINES

Filed Jan. 16, 1967 4 Sheets-Sheet 3

United States Patent Office 3,505,659
Patented Apr. 7, 1970

3,505,659

TECHNIQUES FOR TIME SHARING MEMORY SENSE AMPLIFIERS USING DELAY LINES

Michael J. Kelly, Melrose Park, and Bernard J. Rekiere, Addison, Ill., assignors to Automatic Electric Laboratories, Inc., a corporation of Delaware

Filed Jan. 16, 1967, Ser. No. 609,468
Int. Cl. H03k *13/256;* G11c *7/00;* G08c *15/06*
U.S. Cl. 340—174 6 Claims

ABSTRACT OF THE DISCLOSURE

Apparatus for time sharing sense amplifiers to reduce the number of sense amplifiers required in a memory system. Delay circuits or delay lines between memory sense conductors and a strobe-operated sense amplifier read all data bits of a word, extracted from memory in parallel, into a register in series. A second embodiment provides a sense amplifier having gated output circuits which are delay-strobe operated via delay lines so that the above-mentioned serial data may be registered in parallel. Another embodiment provides a separate sense amplifier for corresponding data bits of a plurality of machine words for use in data processing systems wherein each memory word comprises a plurality of machine words.

BACKGROUND OF THE INVENTION

This invention relates to circuits for reading and registering output signals of a memory system, particularly to circuits for time sharing and thus reducing the number of sense amplifier circuits.

Heretofore, it has been a general practice to provide an amplifier (and possibly a preamplifier) per data bit to sense output signals. Data processing systems in which a machine word is equal in bit length to a memory word of $n$ bits require $n$ sense amplifiers (and possibly $n$ preamplifiers) by such techniques. This adds to the cost of a memory system and, of course, such costs increase for greater word lengths. This problem is compounded in systems wherein larger memories store a plurality $p$ of machine words of $m$ bit length as a single memory word of $m \times p$ bits. A portion of the input address is employed to select one of the machine words for processing. Word selection of this type may be seen by referring to the United States patent application of J. M. Donnelly et al., Ser. No. 379,941, filed July 2, 1964 and assigned to the same assignee as the present invention. Unfortunately $m \times p$ amplifiers are required to provide sufficient signal level for selectively gating one of the machine words into an $m$ bit register via $m$ other amplifiers.

SUMMARY

Briefly, and in contrast to the above types of memory reading configurations, memory output circuits constructed according to the present invention employ a minimum number of preamplifier and amplifier circuits. Delay circuits, which may be delay lines of progressively longer delay times (i.e. $t$, $2t$, $3t$, etc.), individual to memory output or sense conductors, present parallel-read data to a sense amplifier in serial form. This data may be registered in series, or reconverted to parallel for registration by gating techniques under the control of a strobe-delay circuit combination. These circuits provide that only one amplifier circuit is needed for systems wherein a machine word is equal to a memory word. The maximum number of amplifiers required for systems wherein a memory word comprises a plurality of machine words is equal to the number of data bits of a single one of the machine words.

The present invention is particularly applicable to data processing systems wherein qualitative criteria, other than memory speed, dictate, or make possible, the use of a memory having a cycle time much shorter than that of the adjacent processing system. For example, a memory selected for its electrically alterable and nondestructive readout capabilities may inherently be much faster than the system in which it is to operate. The designer is therefore provided with additional design flexibility in selecting a memory and its electronic reading equipment.

BRIEF DESCRIPTION OF THE DRAWINGS

A better understanding of the invention, its organization and construction may be had by referring to the description below in conjunction with the following drawings in which.

DESCRIPTION OF THE PREFERRED EMBODIMENTS

Figure 1:
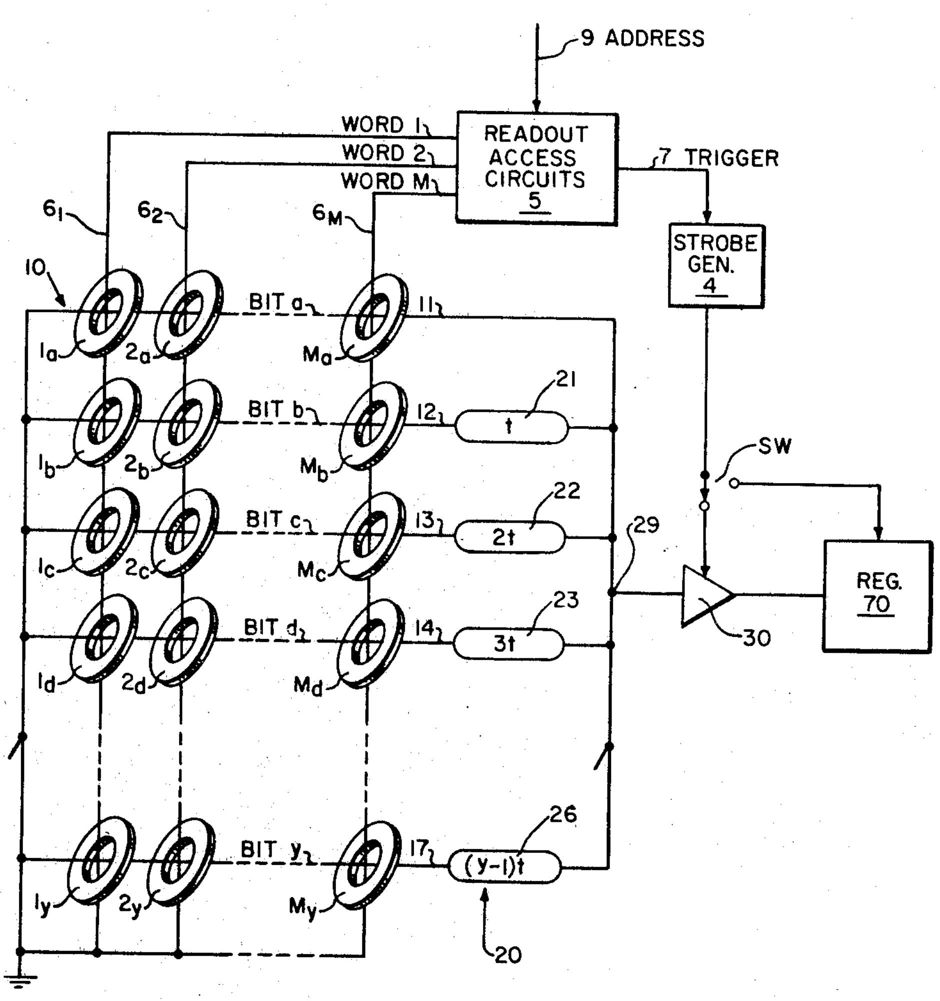
FIG. 1 is a combination block and schematic diagram of an embodiment of the invention which illustrates time sharing of a sense amplifier and serial registration of parallel-read data.

FIG. 1 shows a $M \times y$ memory 10 comprising magnetic cores $1_a$–$1_y$ to $M_a$–$M_y$ which for purpose of illustration symbolize individual memory cells. As will be understood from the following description, the memory may be of any type wherein information is readout on a parallel set of output conductors. For simplicity, only reading access conductors $6_1$–$6_M$ have been shown threading the cores, since the invention is concerned only with readout and registration of data.

Figure 4:
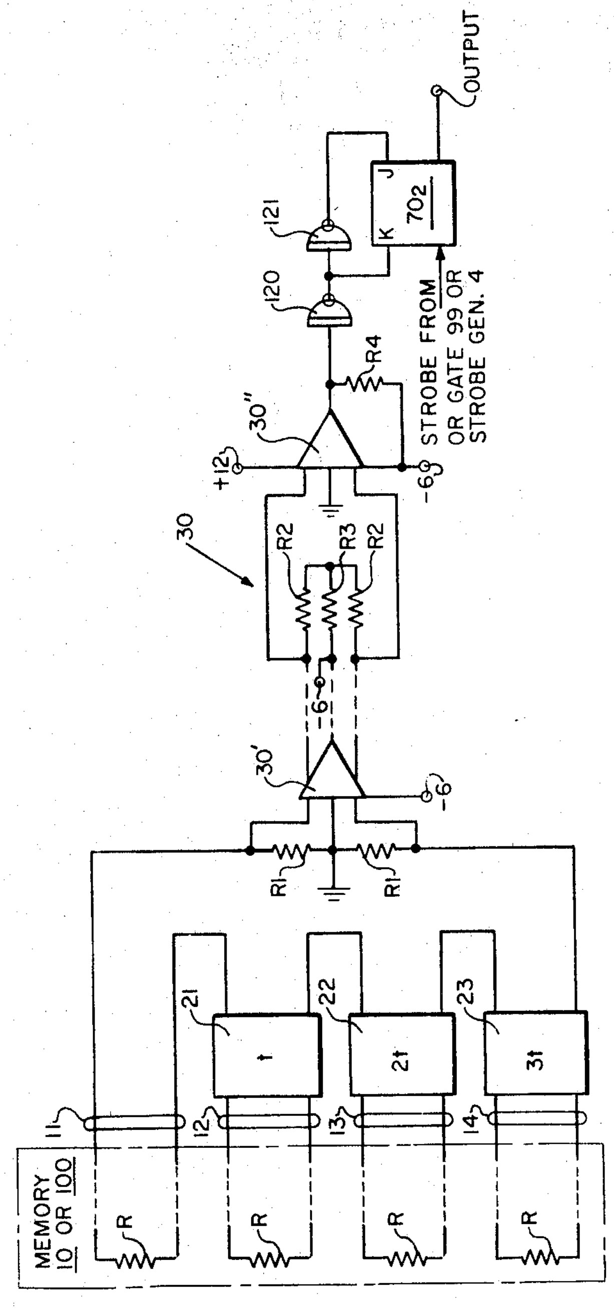
FIG. 4 is a schematic representation of an experimental model of the invention particularly pointing out a variation in the construction of the serializing delay circuits and a variation in the strobing technique.

Sense conductors 11–17 thread respective common bit rows (i.e. $1_a$, $2_a$–$M_a$; $1_b$, $2_b$–$M_b$; etc.) of the memory and, with the exception of lead 11 which is directly connected, are commonly connected to junction 29 via individual time delay circuits 21–26. The delay circuits may be delay lines and are constructed to provide progressively and incrementally increased delays of $t$, $2t$, $3t$ . . . $(y-1)t$. The common connection of the sense conductors in this manner provides a parallel-to-series data conversion circuit 20. Common point 29 connects to an input of amplifier 30 whose output is connected to a register 70. Amplifier 30, when necessary, includes a preamplifier stage and will be hereinafter referred to as a gated type amplifier, for example, a differential amplifier or a comparator. The amplifier also has an input from strobe generator 4 which produces $y$ output pulses upon operation. Switch SW indicates that the strobe could be applied to the register rather than to the amplifier 30. Reference may be taken to FIG. 4 for an illustrative circuit showing the strobe being applied to the register.

Readout access circuits 5 are connected to conductors $6_1$–$6_M$ to control reading and to strobe generator 4 via trigger conductor 7. Memory access circuits are well known in the art and are therefore not shown in detail herein. Generally such circuits comprise means to decode an input address (represented by input 9) and means to energize reading, writing and word selection apparatus. Reference in this respect may be taken to the above Donnelly et al. application, Ser. No. 379,941.

In the operation of the circuits of FIG. 1, when the access circuits 5 receives and decodes an input address 9, a word solenoid, say $6_2$, is energized to read a word from memory 10. In the type of memory illustrated such energization will result in the presence or absence of a signal on sense leads 11–17 as is well known in the art. Other memories may produce other output signals, for example, bipolar signals, requiring different sense amplifier circuitry. For simplicity, in this illustration a signal (pulse) is induced in each sense line from cores $2_a$–$2_y$. Each of these signals is assigned a time position by circuit 20 and is accordingly presented to junction 29 a time $t$ after the preceding signal due to the delays offered by delay lines 21–26 and are accordingly amplified as a series pulse train by circuit 30. Upon energization of solenoid $6_2$, access circuits 5 also trigger strobe generator 4 via lead 7 to initiate generation of a similarly timed set of $y$ strobe pulses which "gate" the series data pulse train through the amplifier and into register 70. Register 70 therefore provides a serial indication of a word read in parallel.

Sense line 11 may also be provided with a delay line of a delay $t$ which would require increasing the delay of each other delay line by a time $t$. In addition, each strobe pulse would be delayed by an equal time.

Figure 2:
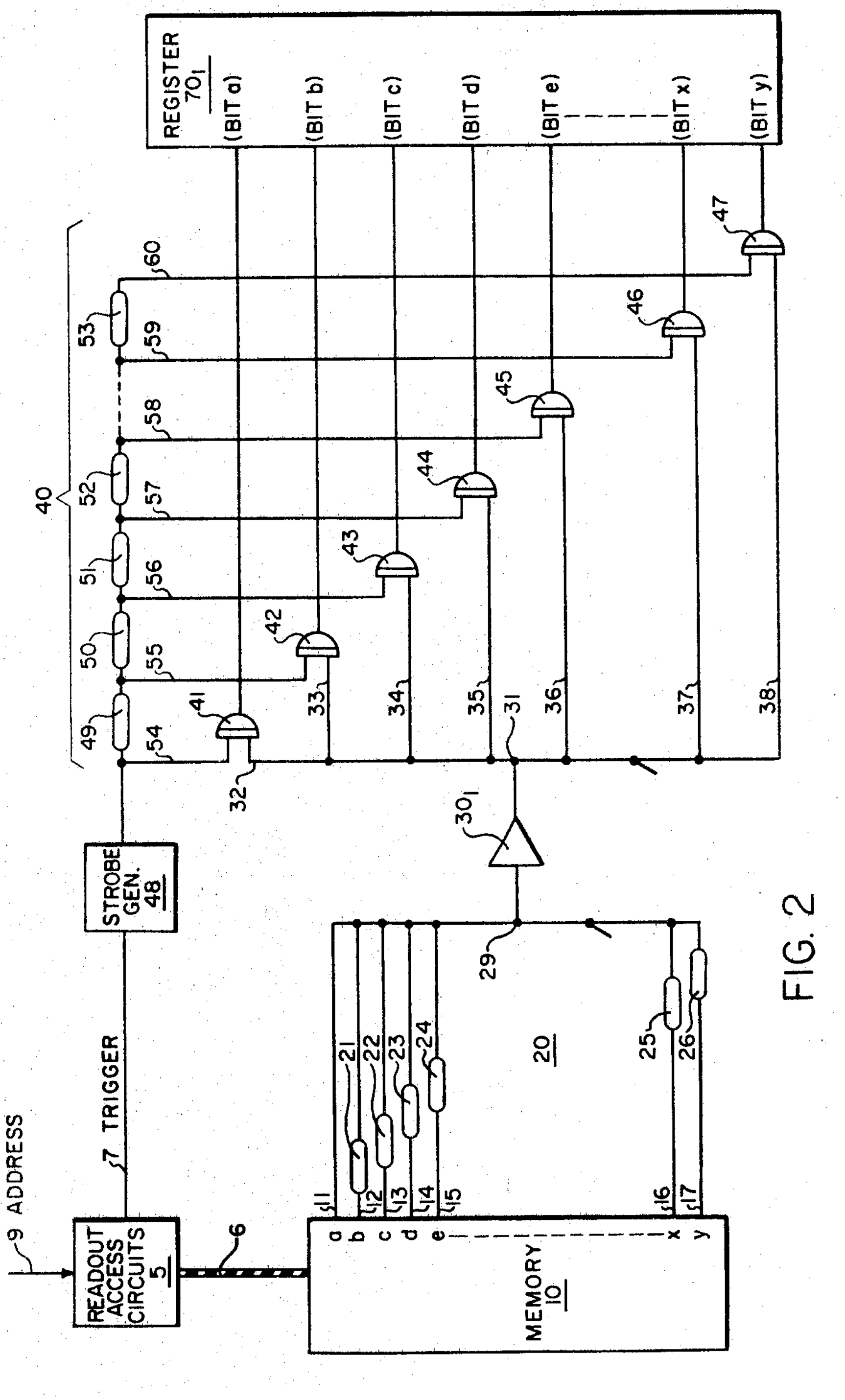
FIG. 2 is a symbolic representation of a variation and amplification of FIG. 1 showing parallel registration of serially-sensed, parallel-read data.

FIG. 2 shows the same general memory construction as is shown in FIG. 1, the elements 10–29 being identically arranged. Amplifier 30 has been replaced by an amplifier $30_1$ of the nongated type. In addition, serial register 70 has been replaced by a parallel-type register $70_1$, having a plurality of stages represented by (Bit $a$), (Bit $b$)–(Bit $y$), and a series-to-parallel data conversion circuit, 40 is interposed between the register and the sense amplifier. The data conversion circuit comprises AND gates 41–47 each having a data input 32–38 from common point or junction 31 (amplifier output) and a separate strobe input 54–60 from strobe generator 48 via delay lines 49–53 of equal delay $t$. In this arrangement, elements 48–53 provide $y$ pulses with the first pulse being applied to conductor 54 and pulse $y$ being applied to conductor 60.

In FIG. 2, data is extracted from memory in the same manner as FIG. 1 and similarly processed to the input of amplifier $30_1$. This amplifier, ungated, presents the data to junction 31 as a series set of pulses. Upon energization of a solenoid 6 to accomplish the foregoing, the access circuits trigger strobe generator 48 via lead 7 to generate a strobe pulse which is one out of $y$ timed and physically spaced pulses and which drives the tapped delay line 49–53 to produce the remainder of the $y$ pulses. Each of the gates 41–47 has the serial data set at one of its inputs and is opened upon receiving its strobe pulse to pass the appearing one of the serial data set to registration. If as in the above example all bits are represented by a pulse, the gates will be opened in sequence from 41 to 47 due to their respective strobe inputs 54–60. Register $70_1$ indicates parallel registration of parallel-read data serially-processed.

Sense line 11 in FIG. 2 could also be provided with a delay circuit. Such a modification would also require a corresponding modification of increasing the delay time of each other serializing delay line and providing an additional delay $t$ prior to delay line 49 of the strobing circuit.

Figure 3:
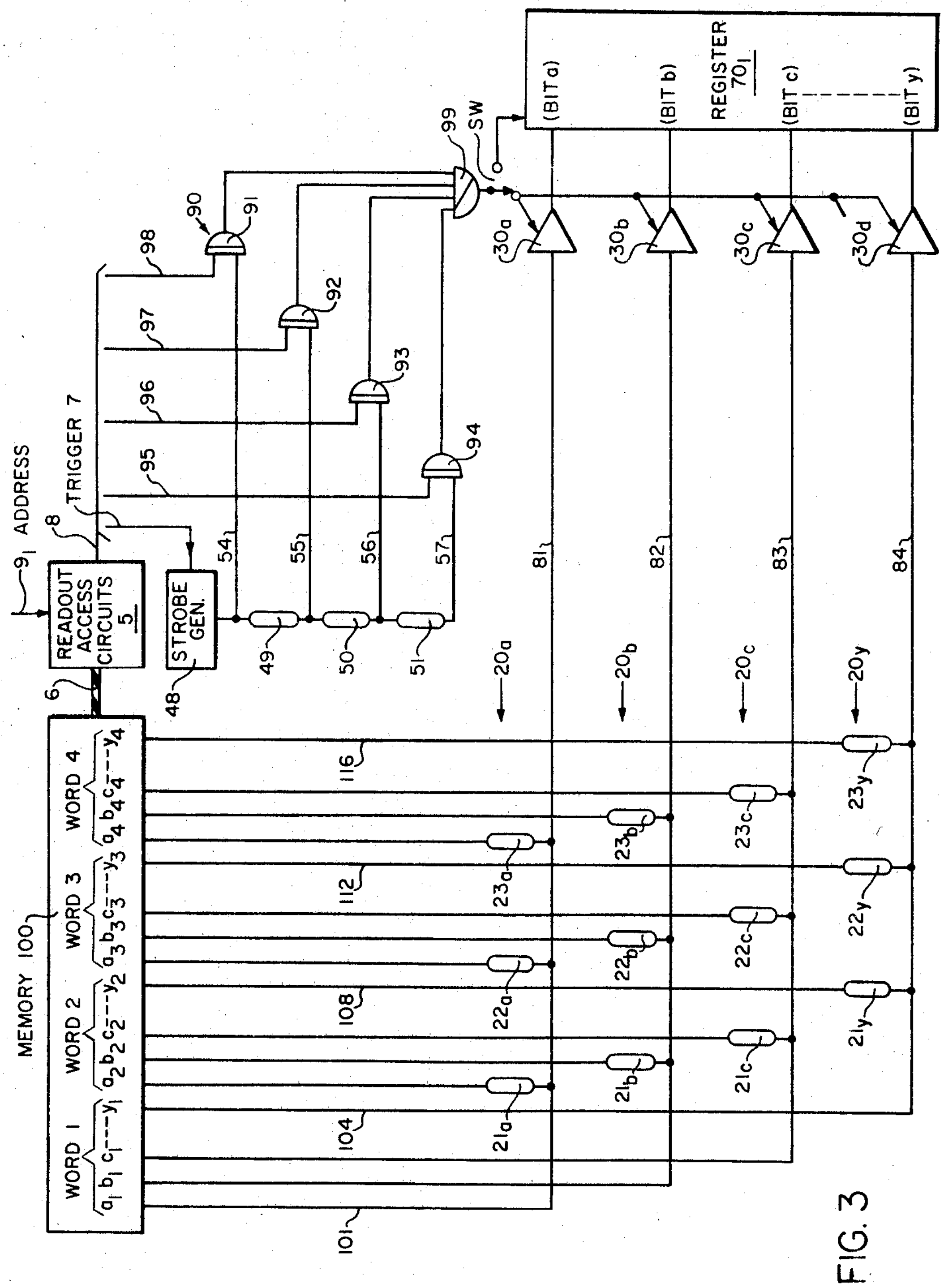
FIG. 3 is another symbolic representation of a variation and amplification of FIG. 1 showing selective parallel registration of one out of a plurality of parallel-read words wherein each set of corresponding bits of said plurality of words is processed serially through a sense amplifier.

FIG. 3 shows a variation of the circuits of FIG. 2 wherein each memory word of memory 100 comprises a plurality of machine words, WORD 1 to WORD 4, which in turn comprises a plurality of data bits $a_1$–$y_1$; $a_2$–$y_2$; $a_3$–$y_3$ and $a_4$–$y_4$. A plurality of serializing circuits $20_a$–$20_y$, one for each of the common bits of the machine words, connect common bit ones of the sense conductors 101–116 to respective inputs of gated type amplifiers $30_a$–$30_y$ via common connections 81–84. A strobing circuit 48–51, connected to the access circuits by conductor 7 of cable 8 provides a sequence of four timed pulses individually to a series to parallel data conversion circuit 90 via leads 54–57. Circuit 90 comprises AND gates 91–94 having the just-mentioned timing inputs and respective word select inputs 95–98. Gates 91–94 have their outputs connected as inputs to an OR gate 99 which in turn has its output connected to the gate inputs of amplifiers $30_a$–$30_y$. Separate sections (not shown) of register $70_1$ are connected to the outputs of the sense amplifiers. Again, switch SW denotes that strobing may be applied to the register rather than to the amplifiers.

Data reading is accomplished in much the same manner as in FIG. 2. An address $9_1$ is decoded for energizing a solenoid 6, as described hereinbefore, and additionally a portion of the address is decoded to mark one of the conductors 95–98 for machine word selection. For purpose of illustration, consider conductor 96 as being so marked.

Energization of a solenoid 6 causes information pulses to be present on sense leads 101–116. All corresponding bits $a_1$–$a_4$; $b_1$–$b_4$, etc are processed serially to their respective amplifiers $30_a$–$30_y$ via conductors 81–84 and their associated data converter circuits $20_a$–$20_y$. Due to the time delays $t$, $2t$, $3t$ of the delay lines 21, all bits of WORD 1, then WORD 2, then WORD 3, etc., each set in series, are present at the inputs of the amplifiers. Each of the machine words is, therefore, assigned a separate time position. The strobing apparatus operates as in FIG. 2; therefore, after a delay of $2t$, gate 93, primed by the word select mark on lead 96, opens and in turn opens OR gate 99. The amplifiers $30_a$–$30_y$ will then pass the third word, WORD 3, to the register $70_1$ thereby registering bits $a_3$–$y_3$.

FIG. 3 could also be modified to provide a delay for the bits of WORD 1. As in FIG. 2, the strobe would also be modified to provide for the additional delay.

FIG. 4 illustrates a portion of an experimental system employing the teachings of the present invention. The delay line configuration could also be employed in the foregoing examples as the serializing function is the same. Sense lines 11–14 are shown as being terminated by a resistance R, lines 12–14 via delay lines 21–23. Each of these delay lines are fabricated from a plurality of delay sections of 100 nanoseconds delay where $t$ equals 300 nanoseconds. Therefore delay line 21 has a delay of 300 nanoseconds, delay line 22 has six sections for 600 nanoseconds delay and delay line 23 employs nine sections or 900 nanoseconds delay. Standard delay lines known as Wee Bit delay lines by Nytronics, Inc. were employed. The sense and delay lines are connected to the input of an amplifier 30′ via equal resistances R1. Only one stage of amplification 30′ is shown although three RCA CA3004 integrated circuits were used. Coupled to amplifier 30′ via resistances R2 and R3 is amplifier 30″, in this instance a Fairchild μA710C integrated circuit. From amplifier 30″, and a −6 volt supply via R4, gates 120 and 121 (1/2 Sylvania SG143) connect to inputs of a $jk$ flip-flop $70_2$ which is provided by a Sylvania circuit SG53. In FIG. 4, the strobe is applied to the flip-flop $70_2$ rather than to the amplifier 30 of FIGS. 1 and 3.

The arrangement of FIG. 4 operates similar to the arrangement of FIG. 1. The major difference between the two is the coupling of the delay lines. The sense and delay line combinations each appear as an impedance $Z_0$ and the input to amplifier stage 30' appears as an impedance which is a multiple of $Z_0$, in the illustrated circuit $10Z_0$. Whereas in the previously described circuits, a parallel relationship of a plurality of impedance $Z_0$ and, an input impedance of $10Z_0$ caused signal degradation due to impedance mismatch and out of phase signal reflections, in FIG. 4 the series configuration provides, in this example a $13Z_0$ impedance appearance to all signals toward the amplifier stage 30' and reflected signals are in phase with and reinforce the incident data signals.

What is claimed is:

1. A data reading system comprising a memory for storing data, control means to read data from said memory, a plurality of output conductors for said memory which are simultaneously energizable upon reading to carry data signals, an amplifier circuit to sense said data signals, and a parallel-to-series data conversion circuit including a first plurality of delay lines connected between said plurality of output conductors and said amplifier circuit to provide said simultaneously occurring data signals to said amplifier circuit as a serial set of data signals, each of said delay lines having a unique delay time and connected between a separate one of said memory output conductors and said amplifier, a strobing circuit including a pulse generating circuit connected to and operated by said control means upon reading from said memory to generate a timing pulse, said strobing circuit including a second plurality of delay lines connected in series with said pulse generating circuit to reproduce said timing pulse a like plurality of times, each of said second delay lines and its preceding delay lines in said series connection having a total delay time equal to the unique delay time of a separate delay line of said first plurality of delay lines, and a timing pulse output conductor connected to each of said second delay lines; a register including a plurality of stages; and a plurality of gate circuits, each of said gate circuits including a common input connection from said amplifier circuit to receive said serial set of data signals, an input connection from an individual timing pulse output conductor to receive a timing pulse, and an output connected to an individual one of said plurality of register stages, each of said gates being strobed by its associated timing signal to store the data of the simultaneously occurring data signal in the associated stage of said register.

2. A data reading system comprising a memory for storing data, control means to read data from said memory, a plurality of output conductors for said memory which are simultaneously energizable upon reading to carry data signals, an amplifier circuit to sense said data signals, and a parallel-to-series data conversion circuit connected between said plurality of output conductors and said amplifier circuit to provide said simultaneously occurring data signals to said amplifier circuit as a serial set of data signals, a pulse generator including a plurality of pulse output conductors, said pulse generator connected to and operated by said control means to provide on each of said pulse output conductors a time spaced pulse corresponding to the time of a data signal of said serial set of data signals, a register including a plurality of stages, and a plurality of gate circuits, each of said gate circuits including a common input connection from said amplifier circuit to receive said serial set of data signals, an input connection from an individual one of said plurality of pulse generated pulse outputs to receive a time spaced pulse therefrom, and an output connection to an individual stage of said register, each of said gates operated to store data in its corresponding register stage upon the coincident receipt of a data signal and a time spaced pulse.

3. A data reading system comprising: a memory for storing data in the form of a plurality of first words, each said first word including a plurality of second words, each said second word including a plurality of data bits and each data bit having a corresponding bit in each of said second words forming a plurality of groups of corresponding bits, a plurality of output conductors separately associated with the plurality of data bits which constitute a first word; a plurality of amplifiers separately associated with said plurality of groups of corresponding data bits; a register connected to said plurality of amplifiers; control means connected to said memory and operable to read a first word from said memory and thereby effect data signals simultaneously on said plurality of output conductors; a word selection circuit connected between said control means and said plurality of amplifiers for selecting from a read first word one of said plurality of second words, said selection circuit including a pulse source operated by said control means upon reading from said memory to provide a plurality of timing pulses representing time positions and means for assigning said second words to said time positions, said assigning means operated by said control means and by said pulse source to condition said plurality of amplifiers to sense data signals during the time position associated with a selected second word; and a plurality of parallel to series data conversion circuits separately connected between the output conductors of said plurality of output conductors which are associated with said plurality of groups of corresponding bits and said plurality of amplifiers, each said parallel-to-series conversion circuit including means to assign individual bits of its associated group to the same time positions as assigned to the plurality of second words by said assigning means of said word selection circuit.

4. A data reading system comprising: a data storage device having a plurality of output conductors, readout means connected to said storage device, said storage device responding to operation of said readout means to impress simultaneously data pulses in parallel on said output conductors, a gating circuit, a register, a plurality of delay lines connecting each of said output conductors to an input of said gating circuit, the output of said gating circuit being connected to said register, strobing means connected to said readout means and to another input of said gating circuit, said strobing means generating a series of gating pulses with predetermined intervals therebetween in response to operation of said readout means, said delay lines delaying said data pulses impressed on respective ones of said conductors by said data storage device for different periods corresponding to the difference in time between the initial impression of said data pulses on said output conductors and the generation of a respective one of said gating pulses, and said gating circuit being responsive to simultaneous reception of said gating pulses from said strobing means and said data pulses from said delay lines to conduct a series of data pulses to said register for each application of parallel data pulses to said output conductors.

5. The data reading system according to claim 4, wherein each of said delay lines includes output terminals, the output terminals of said plurality of delay lines being serially connected to form an output circuit and wherein said gating circuit includes an input serially connected in said output circuit.

6. In a data system having a plurality of data read-out conductors, means for applying data pulses simultaneously in parallel on said read-out conductors, and a common output conductor to which said parallel data is to be applied in series, the duration of each of said data pulses being short compared with the period of a series of said data pulses, a parallel-to-series conversion circuit comprising: a plurality of transmission delay lines having different inherent transmission delays, each of said delay lines having an input and an output, the input of each of said delay lines connected to an individual one of said read-out conductors, said outputs of all of said delay lines connected to said common output conductor, and said data signals applied in parallel to said inputs of said delay lines being transmitted from their outputs to said common output conductor in a sequence determined by said different transmission delays.

References Cited

UNITED STATES PATENTS

| | | | |
|---|---|---|---|
| 3,129,411 | 4/1964 | Albrecht | 340—174 |
| 3,166,637 | 1/1965 | Oleson | 178—26 |
| 3,381,087 | 4/1968 | Achramowicz | 178—26 |
| 3,415,944 | 12/1968 | Viesi | 178—3 |
| 3,343,140 | 9/1967 | Richmond | 340—172.5 |

BERNARD KONICK, Primary Examiner

K. E. KROSIN, Assistant Examiner

U.S. Cl. X.R.

340—173, 347